United States Patent [19]

Levine

[11] Patent Number: 4,562,475
[45] Date of Patent: Dec. 31, 1985

[54] DC RESTORATION OF SYNCHRONOUSLY DETECTED CCD IMAGER OUTPUT SIGNALS

[75] Inventor: Peter A. Levine, Trenton, N.J.
[73] Assignee: RCA Corporation, Princeton, N.J.
[21] Appl. No.: 590,035
[22] Filed: Mar. 15, 1984
[51] Int. Cl.$^4$ ............................................... H04N 3/14
[52] U.S. Cl. .................................... 358/213; 358/221; 358/171
[58] Field of Search ............... 358/213, 212, 209, 221, 358/171, 172, 170, 177, 167

[56] References Cited
U.S. PATENT DOCUMENTS

| | | | |
|---|---|---|---|
| 3,862,361 | 1/1975 | George | 358/170 |
| 4,330,753 | 3/1982 | Davy | 329/50 |
| 4,369,466 | 1/1983 | Matsuzaki et al. | 358/171 |
| 4,496,982 | 1/1985 | Levine | 358/213 |

*Primary Examiner*—Keith E. George
*Assistant Examiner*—Stephen Brinich

*Attorney, Agent, or Firm*—Joseph S. Tripoli; George E. Haas; Allen LeRoy Limberg

[57] ABSTRACT

A CCD imager is operated in cascade with a low-frequency-suppression filter and a synchronous detector, which synchronous detector uses as its switching carrier a harmonic of the clocking frequency of the CCD imager output register. The low-frequency-suppression filter has its zero-average-value output response referred to a noise-free reference level. At times between picture trace intervals, when d-c restoration is to be done, this reference level is caused to appear at the synchronous detector output instead of synchronously detected filter response. D-c restoration is made to this reference level and is thus made substantially more noise-free. The need to clock empty wells from the CCD imager for d-c restoration is avoided. This allows shortening the time the CCD imager output register is clocked during each line trace, allowing reduction in the power required for operating the imager and increasing available time for transfer from the image storage register to the output register.

17 Claims, 9 Drawing Figures

DC RESTORATION OF SYNCHRONOUSLY DETECTED CCD IMAGER OUTPUT SIGNALS

The present invention relates to the d-c restoration of synchronously detected output signals from a charge-coupled device (CCD) imager.

BACKGROUND OF THE INVENTION

L. N. Davy in U.S. Pat. No. 4,330,753 issued 18 May 1982 and entitled "METHOD & APPARATUS FOR RECOVERING A SIGNAL FROM A CHARGE TRANSFER DEVICE" describes the synchronous detection of CCD imager output signals at a harmonic of the output register clocking frequency to recover reduced-noise video. In U.S. Pat. App. Ser. No. 525,491 filed Aug. 22, 1983, entitled "IMPROVED RECOVERY OF SIGNAL FROM CHARGE TRANSFER DEVICES," and assigned to a common assignee RCA Corporation (substantial portions of which application appear in the detailed description of the drawing to follow), the present inventor describes the use of synchronous detectors of a sample-and-hold type being used to recover video from CCD output signal in which the lower portion at least of the baseband is suppressed.

The d-c restoration of CCD imager output signals has heretofore been done as follows. The line register used for parallel-to-serial conversion of image sample format at the output of the CCD imager has its clocking continued for a time after the image samples transferred in parallel into the line register have been serially clocked out of the line register. The continued clocking of the line register provides samples of wells which are empty except for the very small dark current accumulation in the line register, and these samples are used to establish black level. D-C restoration is accomplished by clamping of the video output signal to the reference dc level each line, during the time black level is established. Since the periods of time between the picture portions of line trace are of fixed duration, this method of d-c restoration requires limitation of the length of time that empty wells are clocked out of the imager in order to establish black level. This time has to be limited to a fraction of line retrace interval, to allow time for the ensuing transfer of a row of charge packets in parallel from the field storage register to the output line register during the remainder of line retrace interval.

When synchronous detection of harmonics of CCD output register clocking frequency has been employed, the above-described method of d-c restoration has continued to be used, with clamping taking place after the synchronous detector. However, d-c restoration of this type is affected by noise occurring during the clamping interval; and the error in d-c restoration is retained through the remainder of the line, giving rise to streak noise extending across lines of the picture reconstituted from the video originating from CCD imager. The streak noise can be suppressed by extending the time constant associated with d-c restoration to well over a field time, but it is well-known that a time-constant longer than ten lines or so is to be avoided for other reasons. The streak noise problem becomes increasingly noticeable at low ambient light levels, where the CCD imager is provided only a few tens of electrons charge per image sample, requiring the amplification of the imager output signal to be increased. The noise of the amplifier is not only added to the CCD imager output signal during image read-out times, but is also added during the times clamping is done to restore d-c. This internally-generated amplifier noise added to the variably amplified clock noise provides the noise that afflicts d-c restoration.

This prior art method of d-c restoration is also disadvantageous in that the lengthening of the time the output line register is clocked each line encroaches upon the line retrace interval, reducing the time available for line by line transfer in the preceding field storage register. In larger imagers where the gate electrodes are wider in the field storage register, so their associated capacitances are larger, shortening of the time available for line by line transfer in that register reduces the modulation transfer function (MTF) appreciably. That is, the complete charge packet describing an image sample fails to be clocked forward; and a smear results, reducing resolution in the direction perpendicular to line scan.

When the low-frequency components of recovered video signal are developed solely by synchronous detection of the CCD output signal at a harmonic of output line register clocking frequency, the suppression of lower-frequency baseband components in the CCD imager output signal results in a signal of zero average value being supplied to the synchronous detector. Therefore, there is no direct-voltage average step introduced into the synchronous detector output as input signal to the synchronous detector is discontinued or resumed. This zero average value signal, while not at black level for the baseband spectrum, is at black level for the sideband spectrum around harmonics of the clocking frequency of the CCD imager output register.

Where the lower frequency components of the baseband spectrum are suppressed in the CCD imager output signal prior to its synchronous detection, leaving the higher frequency components of the baseband spectrum for video peaking, as described in U.S. Pat. App. Ser. No. 525,491, one finds there is a relatively-small-amplitude average step as the input signal to the synchronous detector is discontinued or resumed during the time empty well samples are clocked out of the line register at the CCD imager output. The relatively-small-amplitude average step is presumably due to synchronous detection of clock noise and is not large enough to affect d-c restoration appreciably. Furthermore, the error introduced is invariant with signal variation and can be compensated against in the later video circuitry. Remnant high frequency components of the CCD imager output signal baseband spectrum are asynchronous to clocking frequency harmonics, so do not give rise to d-c shifts in synchronous detector output signal. As in the previous case where the baseband spectrum is completely suppressed, zero average value signal at the input of the synchronous detector is at black level for the sideband spectrum around harmonics of the clocking frequency of the CCD imager output register.

SUMMARY OF THE INVENTION

The invention is embodied in a d-c restoration circuit for a CCD imager followed by a low-frequency suppression filter followed by a synchronous detector operating at a harmonic of the clocking frequency of the CCD imager output line register. The low-frequency suppression filter is arranged to have its zero average value output response referred to a noise-free reference level. During the d-c restoration interval the application of low-frequency-suppression filter response to the synchronous detector is interrupted, and the noise-free reference level is applied instead. Then the output signal of the synchronous detector is clamped to a prescribed d-c level to provide low-noise d-c restoration Since d-c restoration is made at a time when the synchronous detector input signal is not supplied from the CCD imager, the output line register of the CCD imager does not have to continue to be clocked after charge packets descriptive of image samples have been serially transferred out of the register, in order to supply empty well samples for d-c restoration purposes. The full time between picture line trace periods is available for the parallel transfer of a row of charge packets from field storage register to output line register. These relaxations on the requirements for high speed register clocking save considerable power in the operation of the imager (typically 10% or so). Also, d-c restoration can be effected up to times just prior to picture trace.

DETAILED DESCRIPTION

Figure 1:
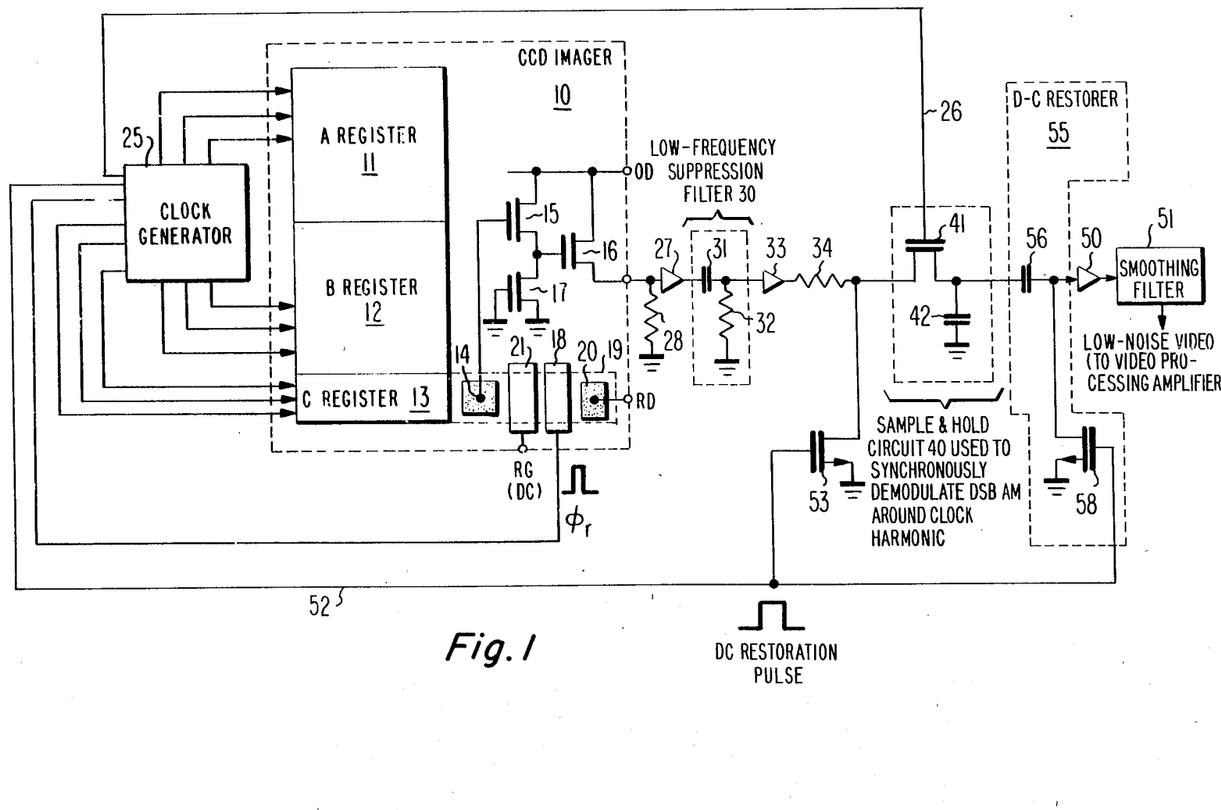
FIG. 1 is a schematic diagram of the signal recovery system of U.S. Pat. App. Ser. No. 525,491 shown used with a CCD imager of the field transfer type and modified to incorporate d-c restoration in accordance with the present invention.

The FIG. 1 signal recovery system is shown being used with a CCD imager 10 which by way of example is of field transfer type. In addition to a floating diffusion output stage, CCD imager 10 includes per convention an image (or A) register 11, a field storage (or B) register 12, and a parallel-input-series-output (or C) register 13. Charge packets are regularly clocked forward from the output of C register 13 to a potential well disposed under floating diffusion 14, and the magnitude of charge in each packet is then determined by an electrometer comprising a cascade connection of source-follower metal-insulator-semiconductor field effect transistors 15 and 16. A further MISFET 17 is connected as a constant-current-generator source load for MISFET 15, and MISFET 16 is provided a source load by off-chip resistor 28 across which resistor the CCD imager 10 output signal samples appear. A direct potential OD is applied to the drains of MISFET's 15 and 16 to condition them for source follower operation.

After each charge packet is measured, the potential on floating diffusion 14 as applied to the gate of MISFET 15 is reset responsive to a $\phi_r$ pulse applied to a reset gate 18. This pulse per convention is somewhat narrower than the clocking pulse applied to the last clocked gate (not specifically shown) of C register 13 and is disposed to occur within the time that clocking pulse appears. Reset gate 18 is disposed "over" a charge transfer channel 19 extending through the C register 13 and beyond to include floating diffusion 14 and a reset drain 20. More particularly, reset gate 18 is disposed "over" charge transfer channel 19 between floating diffusion 14 and reset drain 20 and is preceded by a d-c gate 21, to which gate 21 a direct potential RG is applied. D-C gate 21 is preferably a short gate to reduce the amount of charge thereunder and is used to prevent the $\phi_r$ pulses applied to reset gate 18 from electrostatically coupling to floating diffusion 14.

Resetting of the potential on floating diffusion 14 can be done, by clamping to the direct potential RD applied to the reset drain 20. This essentially conforms to the practice used conventionally when the baseband spectrum of CCD imager 10 output signal is utilized as a video signal source.

However, where CCD imager 10 output is filtered to suppress at least the lower baseband frequencies below a corner frequency, $f_c$, and the filter response is then synchronously detected at a harmonic of C register 13 clocking frequency, as is done in the FIG. 1 apparatus, resetting has to be done carefully to avoid reset noise in the synchronous detection response. More particularly, when floating diffusion 14 is reset to reset drain potential RD, the conclusion of reset should take place a time before admission of a new charge sample "under" floating diffusion 14, which time is substantially as long as the reciprocal of $f_c$ in radians per second.

Alternatively, resetting can be to a barrier height established in charge transfer channel 19 and "under" reset gate 18 responsive to the peak of the $\phi_r$ pulse applied to reset gate 18. Or resetting can be to the barrier height established in charge transfer channel 19 under d-c gate 21 by the direct potential RG applied to d-c gate 21.

A clock generator 25 is shown in FIG. 1 supplying three-phase clocking signals to A register 11, B register 12 and C register 13 as are usually applied to a CCD imager of field transfer type. Other well-known clocking schemes using two-, four-, single- or virtual-phase clocking could be used instead. The application of clocking signals to A register 11 is halted during image integration times essentially corresponding to field trace intervals, to allow the accumulation in A register 11 of charge samples descriptive of picture elements of the radiant energy image projected into A register 11. During field transfer portions of the field retrace intervals, the A register 11 and B register 12 are clocked in synchronism at relatively high rate, to transfer the field of accumulated charge samples from A register 11 to B register 12. In field trace intervals B register clocking continues at lowered rate to transfer charge samples a line at a time into respective stages of C register 13 during line retrace intervals. During line trace intervals C register 13 clocking (halted during line retrace) is resumed to transfer charge samples serially to be under floating diffusion 14. Clock generator 25 generates $\phi_r$ pulses for controlling the clamping of the floating diffusion 14 to reset drain potential RD. Clamping is done to provide reset after each charge packet clocked under floating diffusion 14 has had its amplitude sensed. These $\phi_r$ pulses are arranged, for example, to occur within the time periods of the clocking pulses applied to the last clocked gate of C register 13.

As noted in the "SUMMARY OF THE INVENTION" clock generator 25 preferably is such that C register 13 clocking is halted for the entire time between adjacent picture trace intervals. The longer suspension of serial clocking of C register 13 saves considerable operating power, since it is the register operated at highest rate during field trace. Also the clocking forward of most of charge packets in parallel through B register 12 and into C register 13 can be slowed to occupy the entire line retrace interval. This permits good MTF in larger imagers when clocking at normal rates and at normal clock levels. Such larger imagers have relatively large capacitances associated with their wider gate electrodes, which capacitances in combination with the gate electrode resistances give rise to a long RC time constant for charge transfer in the B register.

Clock generator 25 also supplies pulses, at a repetition rate harmonic to the clocking frequency of C register 13 during serial line read-out, as carrier for synchronously detecting CCD imager 10 signal, which pulses are supplied via a connection 26. Clock generator 25 also supplies a d-c restoration control signal at the close of each line trace via a connection 52, the d-c restoration control signal following the last image sample for a line being read out from CCD imager 10.

CCD imager 10 output samples are by way of example applied to the input circuit of a low-noise amplifier 27. Amplifier 27 provides the voltage gain which raises signal level such that its accompanying noise is larger than that introduced by the synchronous detection process to follow. Amplifier 27 gain may be automatically controlled, though this is not specifically shown in FIG. 1. The amplified imager 10 output samples are supplied at low source impedence from the output circuit of amplifier 27 to be passed through a low-frequency suppression filter 30 prior to synchronous detection.

Filter 30 suppresses at least as much of the baseband of the frequency spectrum of the CCD imager 10 output samples as are accompanied by flicker or "1/f" noise subsantially large as compared to background thermal noise. Filter 30 is shown in FIG. 1 as a simple RC high-pass filter comprising a series-arm capacitor 31 and a shunt-leg resistor 32. The corner frequency of filter 30 thus embodied is such that the upper frequencies of the baseband spectrum of the CCD imager 10 output samples combine with the demodulated first harmonic spectrum to provide video high-frequency peaking. The baseband signal remnants and the demodulated first-harmonic-spectrum signal are correlated and are add algebraically in the response of the synchronous detector (provided in FIG. 1 by a sample-and-hold circuit 40), to which detector filter 30 response is supplied as input signal. However, the noise components from the respective bands are uncorrelated and add vectorially in synchronous detector response. This form of video high-frequency peaking consequently provides advantaages in signal-to-noise of synchronous detector response. Filter 30 may alternatively be a band-pass filer selecting for synchronous detection the double-sideband amplitude modulation (DSB AM) sidebands around the carrier frequency corresponding to the repetition rate of the carrier pulses supplied by clock generator 25 via line 26.

Davy describes the use of switching demodulators for synchronous detection, and they can be used in the present invention. However, switching demodulators perform average detection, in which the recovered baseband is accompanied by strong harmonic spectra. It is preferable to use a synchronous detection process that is peak detection by nature, to reduce the strength of the harmonic spectra remnant from the detection process relative to the recovered base-band spectrum. The sample-and-hold circuit 40 performs as such a synchronous detector.

FIG. 1 shows a simple sample-and-hold circuit 40 comprising the selectively conductive channel of a MISFET 41 with which to sample and a capacitor 42 with which to hold the sample. The gate of MISFET 41 receives from connection 26 the pulses supplied at a harmonic of C register clocking frequency, and its channel is selectively rendered conductive responsive to these pulses. MISFET 41 is operative, then, as a transmission gate of a type where control signals (supplied via connection 26) do not feed through to any appreciable extent to the selectively conductive channel. The output circuit of this form of synchronous detector is not balanced respective to input signals supplied to the selectively conductive channel. Baseband spectrum applied to its input appears at its output, to accommodate the video high-frequency peaking scheme described in the previous paragraph.

The detected output signal from sample-and-hold circuit 40, unlike that from a switching demodulator, is a usable video signal with no need for filtering beyond that afforded by video amplifier cut-off. The detected output signal is shown in FIG. 1 applied via a d-c restorer 55 to a buffer amplifier 50 and thence to a smoothing filter 51. Filter 51 is preferably a low-pass filter that removes clocking frequency remnants so as to supply low-noise image details. This noise-free video will usually be directed to a video processing amplifier (not shown) where synchronizing and equalizing pulses will be inserted at times coordinated with the timing of clock generator 25.

The portion of the FIG. 1 signal recovery system thusfar described substantially corresponds to the signal recovery system described in U.S. Pat. App. Ser. No. 525,491. The differences introduced for implementing the present invention will now be described.

In FIG. 1 the response of filter 30 is selectively, rather than continuously, supplied to the input of sample-and-hold circuit 40 used as synchronous detector. During the d-c restoration period at close of lne trace, when black level is to be established, clock generator 25 delivers a d-c restoration pulse to line 52. This d-c restoration pulse applied to the gate electrode of a MISFET 53 renders the otherwise non-conductive channel of MISFET 53 conductive to clamp the input of sample-and-hold circuitry 40 (or other synchronous detector) to a low-noise ground reference potential, the same potential to which the zero average d-c of low-frequency suppression filter 30 is referred (here through resistor 32). Sample-and-hold circuitry 40, functioning as a synchronous detector, continues to detect the zero average level that is the black level for the sideband spectra of clocking frequency harmonics throughout the duration of the d-c restoration pulse.

But circuitry 40 detects zero average level from a low-noise source, rather than the amplified and filtered CCD imager 10 output signal. So d-c restoration is to a low-noise level that is the same line after line, and there is no mechanism for generation of undesired streak noise.

The sample-and-hold circuitry 40 output signal is applied to the input of amplifier 50 via d-c restorer 55. In the restorer, capacitor 56 provides d-c blocking, and the selective conduction of the channel of a MISFET 58 provides keyed clamping of the input connection of amplifier 50 to the low-noise direct potential to which d-c restoration is to be made. This direct potential is shown in FIG. 1 as being, by way of example, the same low-noise ground potential to which the input circuit of sample-and-hold circuit 40 is selectively clamped by conduction of the channel of MISFET 53. The d-c restoration pulse on connection 52 is applied to the gate electrode of a MISFET 58 to control the conduction of its channel, rendering the otherwise non-conductive channel conductive during the d-c restoration period.

Suppose d-c restoration is to be made to the same low-noise potential to which the input of sample-and-hold circuit 40 is clamped during line retrace interval. This form of synchronous detection is operative to restore detected potential at its output connection to this low-noise potential. So, one may direct couple sample-and-hold circuit 40 output connection directly to the ensuing amplifier 50 input connection, omitting the separate d-c restorer stage 55.

In the FIG. 1 circuit if the d-c restoration pulses on line 52 are referred to ground, MISFET's 53 and 58 must be enhancement-mode type for their channels to be non-conductive in the absence of pulses. One may arrange for the threshold voltage of MISFET's 53 and 58 to be relatively small and relatively large and scale the capacitances of capacitors 31 and 56 so keyed clamping of MISFET 53 slightly precedes, accompanies, and (most importantly) slightly succeeds the keyed clamping of MISFET 58. This will avoid set-up of amplifier 50 input circuit on a transient voltage condition.

Many other variations in the d-c restoration scheme of the invention, in which CCD imager output samples with low-frequencies suppressed are replaced by low-noise average d-c level, are possible as will be apparent to one skilled in the art of designing video amplifier chains and acquainted with this disclosure. Examples of such variants will be described later in connection with FIGS. 6 and 7.

The differences between resetting floating diffusion 14 to reset drain potential and to an in-channel potential will now be explained more specifically with the aid of potential profile diagrams. Per convention, these diagrams will at their tops have stylized representations of the features encountered by charge packets moving from left to right in the charge transfer channel, and more positive potentials will be more downward in the diagrams. The diagrams will assume empty potential well under floating diffusion 14, and fringing field effects will for sake of simplicity be ignored when not essential to understanding operation.

Figure 2:
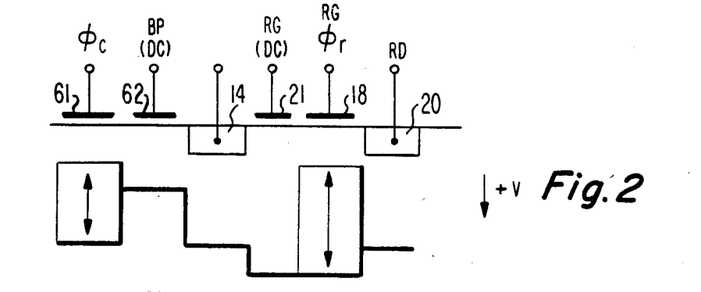
FIG. 2 is a potential profile descriptive of resetting the floating diffusion to reset drain potential as is standard practice.

FIG. 2 is a potential profile diagram descriptive of resetting floating diffusion 14 to reset drain potential RD applied to reset drain 20. $\phi_C$ is the phase of C register clocking applied during line read-out to the last clocked gate 61 of C register 13. C register 13 has a final gate 62 following clocked gate 61, to which final gate a direct potential BP is applied. BP establishes a barrier height to block the passage of charge from a potential well under clocked gate 61 to a potential well under floating diffusion 14 except when $\phi_C$ pulses gate 61 to less positive potential. Gate 21 has a potential RG applied to it as positive as, or more positive than, the drain potential RD. Fringing field effects will strongly affect the actual in-channel potential under gate 21, which is normally made very short to reduce charge sharing with the floating diffusion 14. $\phi_r$ ranges from a voltage during charge measurement time, which is negative enough to erect an unsurmountable barrier for passage of charge from floating diffusion 14 to reset drain 20 diffusion, to a voltage during reset time, which is positive enough to allow the charge level under floating diffusion 14 to drain to RD potential. Consequently, as shown in FIG. 2, floating diffusion 14 is reset to the reset drain potential RD.

Figure 3:
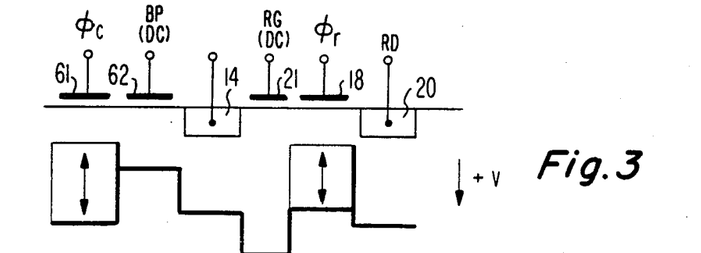
FIG. 3, 4 and 5 are potential profiles descriptive of different representative ways in which resetting of a floating diffusion to an in-channel potential, rather than to reset drain potential, as taught in U.S. Pat. App. Ser. No. 525,491.

FIG. 3 is a potential profile diagram descriptive of resetting floating diffusion 14 to an in-channel potential established by the most positive excursion of $\phi_r$, which is not so positive as RD. This most positive excursion presents a lowered barrier height which will be surmounted by charge carriers in the region of floating diffusion 14 and under gate 21, until a potential level somewhat more positive than the barrier height is established on the floating diffusion 14. This potential is less positive than RD. Reset is to the barrier height with a small offset owing to dark current flowing responsive to thermal excitation of charge carriers. (Variation in the offset owing to this thermal excitation is a principal cause of a low-frequency peak up of the baseband of the MTF when reset is to an in-channel potential.) The problem with this way of resetting to in-channel potential is that there is some problem with suppressing noise on the positive peaks of the $\phi_r$ pulses.

Figure 4:
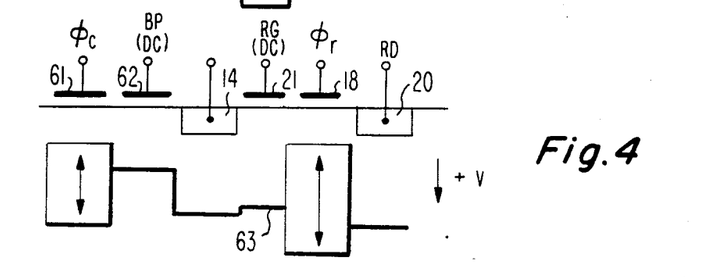

FIG. 4 is a potential profile diagram of a preferred way of resetting floating diffusion 14 to an in-channel potential. Reset gate 18 is operated over a range including reset drain potential RD as in resetting the floating diffusion 14 to reset drain potential, so the positive excursion of $\phi_r$ is not the in-channel potential to which floating diffusion 14 is reset. Rather, the direct potential RG applied to d-c gate 21, which direct potential is easily filtered to remove noise therefrom, is made less positive than reset drain voltage RD. A potential barrier 63 is erected under d-c gate 21, and floating diffusion 14 resets to the barrier potential, with a slight positive offset owing to thermal emptying, since the flow of charge to reset drain 20 when reset gate 18 is positively pulsed proceeds only until the barrier potential can no longer be surmounted.

Figure 5:
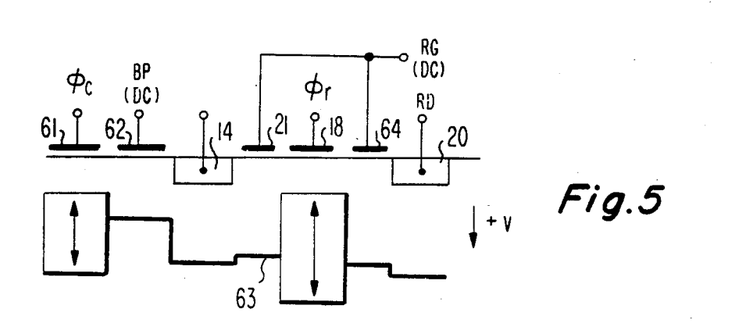

FIG. 5 is a potential profile diagram of resetting to floating diffusion 14 barrier potential under d-c gate 21 when reset gate 18 has a further d-c gate 64 interposed between it and reset drain 20. Such a further d-c gate 64 is found in the CCD imagers presently manufactured by RCA Corporation; further d-c gate 64 is internally connected to d-c gate 21 in these devices. The strongly preferred direction of flow of charge from under reset gate 18 when gate 18 is no longer positively pulsed is towards reset drain 20. This is because the barrier potential under d-c gate 21 tends to be less easily surmounted than the barrier potential under d-c gate 64, owing to fringing field from reset drain 20 reducing the barrier height under d-c gate 64.

Figure 6:
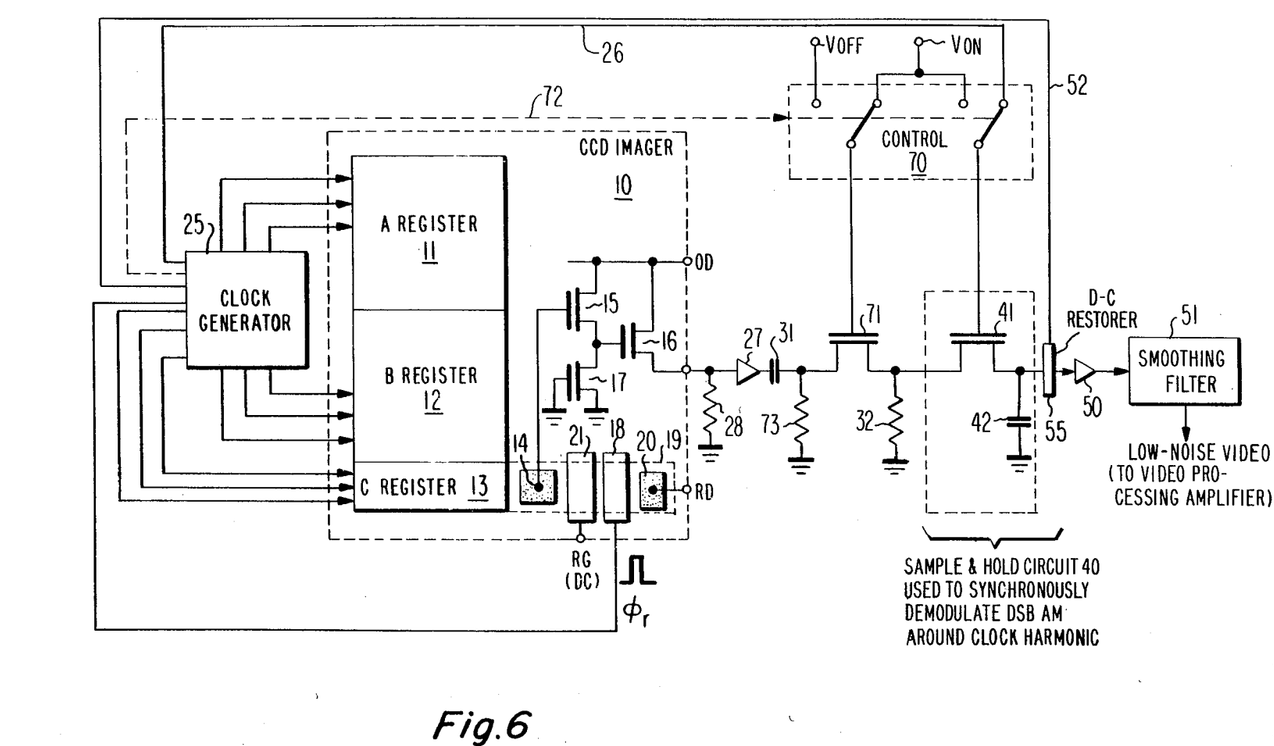
FIG. 6 is a schematic diagram of the signal recovery system of U.S. Pat. App. Ser. No. 525,491 modified in a way alternative to that of FIG. 1 to incorporate d-c restoration in accordance with the present invention.

FIG. 6 shows an embodiment of the invention which is one of the possible alternatives to the FIG. 1 embodiment. An electronic control circuit 70, the functions of which are represented by a simple double-pole double-throw switch configuration, controls the selective conduction of the channels of MISFET 41 and of a further MISFET 71, responsive to control signals received from clock generator 25 via a connection 72. During line trace, when image samples are supplied from the source of source-follower MISFET 16 at the output of CCD imager 10, the channel of MISFET 71 is maintained conductive by control circuit 70 applying a suitable potential $V_{ON}$ to its gate electrode. The channel of MISFET 71 is shown interposed between capacitor 31 and resistor 32 of the low-frequency suppression filter. A resistor 73 connects to ground the end of the channel of MISFET 71 opposite the end connected to ground by resistor 32, so both ends of the channel have direct potential reference against which gate potential bias may be applied. At the same time $V_{ON}$ is applied by control circuit 70 to the gate electrode of MISFET 71 to maintain its channel conductive, control circuit 70 applies to the gate electrode of MISFET 41 the harmonic of C register clocking supplied via connection 26.

At end of line trace image samples are no longer supplied from imager 10; and empty-well samples take their place, or imager 10 output response is blanked. Then control circuit 70 responds to control signal supplied it from clocking generator 25 via line 72 as follows. A potential $V_{OFF}$ is applied by control circuit 70 to the gate electrode of MISFET 71 to render its channel non-conductive. The zero average level tends to be maintained at the input of sample-and-hold circuit 40 by conduction through resistor 32; the level comes from a low-noise ground connection. Control circuit 70 applies the potential $V_{ON}$ to the gate electrode of MISFET 41 to condition its channel to be continuously conductive, rather than being selectively conductive at the harmonic of C register 13 clock rate. Hold capacitor 42 is thereby clamped to noise-free ground through resistor 32, which has low enough resistance to rapidly discharge capacitor 42 (typically within two or three C register clock intervals). The voltage across hold capacitor 42 is applied directly to amplifier 50 input, so sample switch MISFET 41 and resistor 32 act as the keyed clamp for restoring dc level at the input of amplifier 50. Halting the clocking of MISFET 41 gate during d-c restoration is advantageous in that the problem of feedthrough of clock through the gate-to-channel capacitances of the MISFET is obviated.

Figure 7:
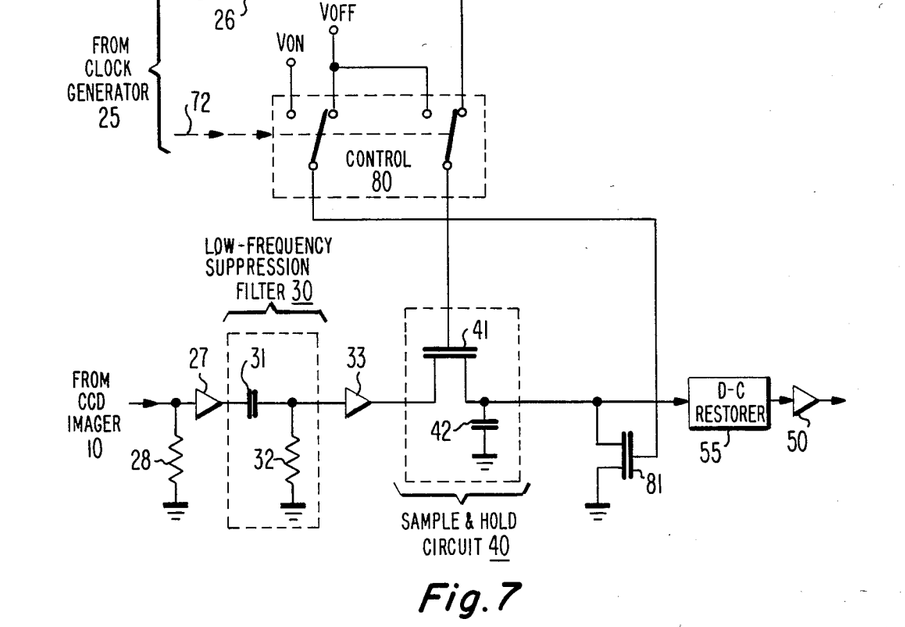
FIG. 7 is a schematic diagram of another alternative embodiment of the invention.

FIG. 7 shows an embodiment of the invention presently preferred, which is another of the possible alternatives to the FIG. 1 embodiment. An electronic control circuit 80, similar to 70, responds to control signals received from clock generator 25 via connection 72 for controlling the selective condition of the channels of MISFET 41 and of a further MISFET 81. MISFET 81 is a selectively applied clamp across the output of sample-and-hold circuit 40, which is directly coupled to the input of amplifier 50.

During line trace, when image samples are suppled across resistor 28 from CCD imager 10, the channel of MISFET 81 is maintained non-conductive by control circuit 80 applying a suitable potential $V_{OFF}$ to its gate electrode. MISFET 81 is selected to be of a type that the soure-to-drain capacitance when non-conductive is small enough that it can be subsumed into hold capacitance of sample-and-hold circuit 40. Control circuit 80 connects the gate electrode of MISFET 41 for receiving the harmonic of C register clocking frequency supplied from clock generator 25 via connection 26 as carrier for the synchronous detection process carried forward by sample-and-hold circuit 40.

When at the end of line trace image samples are no longer supplied from imager 10, control circuit 80 responds to control signal supplied it from clocking generator 25 via line 72 to apply a gate potential to MISFET 41 such as will render its channel non-conductive. The same potential $V_{OFF}$ as applied to the gate electrode of MISFET 81 during line trace may be applied now to the gate electrode MISFET 41 for example, as shown in FIG. 7. The non-conduction of MISFET 41 channel isolates the output of sample-and-hold circuit 40 from noise generated in the foregoing circuitry and eliminates the possibility of clock feedthrough from the foregoing circuitry or from carrier connection 26. Control 80 applies a gate potential $V_{ON}$ to MISFET 81 to render its channel conductive. This clamps the output connection of sample-and-hold circuit 40 to low-noise ground and discharges hold capacitor 42. A low-noise black level is provided for d-c restorer 55 to clamp against.

Figure 8:
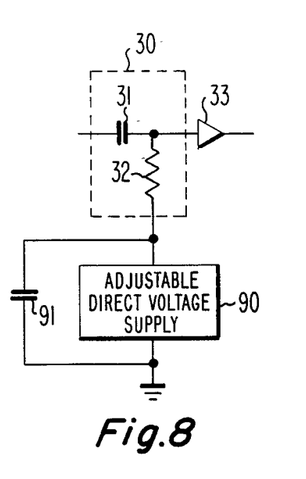
FIGS. 8 and 9 are modifications that maybe made to the FIGS. 1 and 7 apparatus in further embodiments of the invention.
Figure 9:
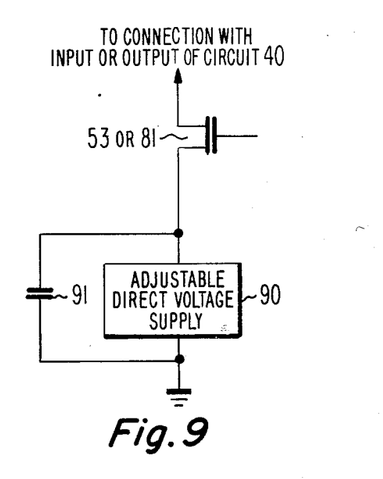

FIGS. 8 and 9 show respective modifications that can be made to the FIGS. 1 and 7 circuits when it is desired to insert a low-noise pedestal in place of true black level during line retrace. The pedestal is generated with an adjustable direct voltage supply 90 which is relatively low-noise (for example, by reason of filtering as provided, again by way of example, by a by-pass capacitor 91). The pedestal is applied as reference potential to low-frequency suppression filter in the modification of FIG. 1 or 7 shown in FIG. 8. In a modification of FIG. 1 shown in FIG. 9 MISFET 53 clamps the input connection of sample-and-hold circuit 40 to this pedestal during line retrace; in similar modification to FIG. 7 MISFET 81 clamps the output connection of sample-and-hold circuit 40 to this pedestal during line retrace. This low-noise pedestal is considered as being "a signal ground" even though it is not a ground insofar as direct potential level is concerned.

While FIGS. 1, 6 and 7 show d-c restoration circuits in connection with the amplifier 50 most closely following the synchronous detector exemplified by sample-and-hold circuit 40, it should be appreciated that d-c restoration may be carried out in later amplifiers in the video amplifier chain. Indeed, the synchronous detector may direct-couple to the input circuit of the amplifier immediately following it, and d-c restoration may take place only later on in the video amplifier chain.

While the invention has been described in connection with a CCD imager of field transfer type, it has application to other semiconductor imagers as well—e.g., to CCD imagers of interline transfer type. The invention is also applicable when the low-frequency-suppression filter 30 and the following synchronous detector 40 are supplied signal from a CCD imager with an output stage other than a floating-diffusion followed by a MISFET electrometer. The invention can be used, for example, with CCD imagers supplying output signal responsive to current from the terminating drain of the output register charge transfer channel.

What is claimed is:

1. A method for operating a solid-state imager generating a raster scanned video signal and incorporating a line register for converting rows of charge packets received in parallel during line retrace times into samples of said raster-scanned video signal serially supplied during line trace times, said method comprising the steps of:

filtering said serially supplied samples to suppress at least the lower frequencies of the baseband spectrum and to provide a filter response with zero average value;

referring said zero average value to a noise-free signal level;

synchronously detecting said filter response at a harmonic of the serial clocking rate of said line register during the line trace time when image samples are serially supplied from said line register;

detecting in place of said filter response said noise-free signal level during portions of line retrace when black level is to be established; and d-c restoring the detected signal during said portions of line retrace when black level is established.

2. A method for operating a solid-state imager as set forth in claim 1 including the step of:

halting the serial clocking of said line register for substantially the entire line retrace time between adjacent lines of image samples in said video signal.

3. A method for operating a solid-state imager, as set forth in claim 2, wherein said solid-state imager is a CCD imager including a field storage register in addition to said line register, including the additional step of:

advancing rows of charge packets through said field storage register and into said line register in parallel a row at a time, over substantially the entire line retrace time between adjacent lines of image samples in said video signal.

4. A combination of:

a solid-state imager from an output register of which samples of a raster-scanned output signal are supplied at a given clocking rate during line trace intervals;

a filter for providing at an output connection of said filter, a zero-average-value response to the samples of said solid-state imager output signal received at an input connection of said filter, in which response at least the lower frequency portions of its baseband frequency spectrum are suppressed;

means for referring said zero-average-value response to an essentially noise-free signal ground;

a synchronous detector for detecting the sideband spectra of a harmonic of said clocking rate, having an input connection for the signal to be detected, an input connection for receiving the harmonic of clocking rate as a synchronous detector carrier signal and an output connection;

means for applying, during line trace intervals said filter response to the input connection of said synchronous detector for the signal to be detected;

means for applying, during line retrace intervals, a noise-free signal level to the input connection of said synchronous detector for the signal to be detected; and means, operative during line retrace intervals, for restoring d-c level in response to the signal supplied at the output connection of said synchronous detector.

5. A combination as set forth in claim 4 wherein the clocking of the output register of said solid-state imager is halted during line retrace intervals.

6. A combination as set forth in claim 4 having:

a capacitor included within said synchronous detector having a first plate connected to an essentially noise-free signal ground and having a second plate;

a first transistor included within said synchronous detector, having a principal current conduction path between first and second electrodes of said first transistor respectively connected to said output connection of said filter and to the second plate of said capacitor, and having a third electrode as a control electrode;

means applying said synchronous detector carrier signal to the third electrode of said first transistor during line trace intervals for causing selective conduction through its principal current conduction path at said harmonic of said clocking rate; and means applying signal to the third electrode of said first transistor during line retrace intervals for causing conduction during at least selected times through its principal current conduction path.

7. A combination as set forth in claim 6 wherein said means for applying during line retrace intervals includes a continuous connection of the first electrode of said first transistor to the output connection of said filter; and wherein said means for applying during lne trace intervals includes a second transistor, having a principal current conduction path between first and second electrodes of said second transistor respectively connected to said filter output connection and to an essentially noise-free signal ground, and having a third electrode as control electrode, and means for applying signal to the third electrode of said second transistor during line retrace intervals for causing conduction in its principal current conduction path.

8. A combination as set forth in claim 7 wherein said means for applying signal to the third electrode of said first transistor during line retrace intervals consists of means for continuing through line retrace intervals to apply said synchronous detector carrier signal to the control electrode of said first transistor.

9. A combination as set forth in claim 4 having:

a capacitor included within said synchronous detector having a first plate connected to an essentially noise-free signal ground and having a second plate;

a first transistor included within said synchronous detector having a principal current conduction path between first and second electrodes of said first transistor and having a third electrode as a control electrode, the second electrode of said first transistor connecting to the second plate of said capacitor;

means applying said synchronous detector carrier signal to the third electrode of said first transistor during line trace intervals for causing selective conduction in its principal current conduction path at said harmonic of said clocking rate;

means applying signal to the third electrode of said first transistor during line retrace intervals, for causing conduction during at least selected times through its principal current conduction path;

a second transistor included in said means for applying during line trace intervals, said second transistor having a principal current conduction path between first and second electrodes of said second transistor respectively connecting to said output connection of said filter and to the first electrode of said first transistor, said second transistor having a third electrode as a control electrode; and means applying a control signal to the control electrode of said second transistor for causing conduction through its principal current conduction path during line trace intervals and forestalling such conduction during line retrace intervals.

10. A combination as set forth in claim 9 wherein said means for applying, during line retrace intervals, a noise-free signal level to the input connection of said synchronous detector essentially consists of
  a resistor connected at a first end thereof to an essentially noise-free signal ground and connected at a second end thereof to the first electrode of said first transistor.

11. A combination of:
  a solid-state imager from an output register of which samples of a raster-scanned output signal are supplied at a given clocking rate during line trace intervals;
  a filter for providing at an output connection of said filter, a zero-average-value response to the samples of said solid-state imager output signal received at an input connection of said filter, in which response in at least the lower frequency portions of its baseband frequency spectrum are suppressed;
  means for referring said zero-average-value response to an essentially noise-free signal ground;
  a synchronous detector for detecting the sideband spectra of a harmonic of said clocking rate, having an input connection for the signal to be detected, an input connection for receiving the harmonic of clocking rate as a synchronous detector carrier signal and an output connection;
  means for applying during line trace intervals said filter response to the input connection of said synchronous detector for the signal to be detected;
  means for applying, during line retrace intervals, a noise-free signal level to the output connection of said synchronous detector for the signal to be detected; and
  means, operative during line retrace intervals, for restoring d-c level in response to the signal supplied at the output connection of said synchronous detector.

12. A combination as set forth in claim 11 wherein the clocking of the output register of said solid-state imager is halted during line retrace intervals.

13. A combination as set forth in claim 11 having:
  a capacitor included within said synchronous detector having a first plate connected to an essentially noise-free signal ground and having a second plate;
  a first transistor include within said synchronous detector, having a principal current conduction path between first and second electrodes of said first transistor respectively connected to said output connection of said filter and to the second plate of said capacitor, and having a third electrode as a control electrode;
  means applying said synchronous detector carrier signal to the third electrode of said first transistor during line trace intervals for causing selective conduction through its principal current conduction path at said harmonic of said clocking rate; and
  means applying signal to the third electrode of said first transistor during line retrace intervals for interrupting conduction during at least selected times through its principal current conduction path.

14. A combination as set forth in claim 13 wherein said means for applying during line retrace intervals includes
  a continuous connection of the first electrode of said first transistor to the output connection of said filter; and wherein said means for applying during line trace intervals includes
  a second transistor, having a principal current conduction path between first and second electrodes of said second transistor respectively connected to said synchronous detector output connection and to an essentially noise-free signal ground, and having a third electrode as control electrode, and
  means for applying signal to the third electrode of said second transistor during line retrace intervals for causing conduction in its principal current conduction path.

15. A method for operating a solid state imager that generates raster scanned video signal and incorporates a line register for converting rows of charge packets received in parallel during line retrace times into samples of said raster-scanned video signal serially supplied during trace times, said method comprising the steps of:
  filtering said serially supplied samples to suppress at least the lower frequencies of the baseband spectrum and to provide a filter response with zero average value;
  synchronously detecting said filter response at a harmonic of the serial clocking rate of said line register during the line trace time when image samples are serially supplied from said line register, thereby to obtain synchronously detected filter response;
  forming an imager output signal using said synchronously detected filter response as said imager output signal during line trace;
  using a noise-free signal rather than synchronously detected filter response in forming said imager output signal during portions of line retrace when black level is established; and
  d-c restoring the detected signal during said portions of line retrace when black level is established.

16. A method for operating a solid state imager as set forth in claim 15 including the step of:
  halting the serial clocking of said line register for substantially the entire line retrace time between adjacent lines of image samples in said video signal.

17. A combination of:
  a solid-state imager from an output register of which samples of a raster-scanned output signal are supplied at a given clocking rate during line trace intervals;
  a filter for providing at an output connection of said filter, a zero-average-value response to the samples of said solid-state imager output signal received at an input connection of said filter, in which response at least the lower frequency portions of the baseband frequency spectrum of said samples are suppressed;
  a synchronous detector for detecting the sideband spectra of a harmonic of said clocking rate, having an input connection for receiving said filter response, and having an output connection;
  means for replacing, during line retrace intervals, a noise-free signal level for response from the output connection of said synchronous detector in an output signal to be dc restored; and
  means, operative during line retrace intervals, for restoring d-c level in said output signal.

* * * * *